United States Patent Office 3,527,578
Patented Sept. 8, 1970

---

3,527,578
PRODUCTION OF URANIUM-NITROGEN COMPOUNDS
Yumi Akimoto, Omiya-shi, Japan, assignor to Mitsubishi Kinzoku Kogyo Kabushiki Kaisha, Tokyo-to, Japan, a joint-stock company of Japan
No Drawing. Filed Sept. 28, 1967, Ser. No. 671,215
Claims priority, application Japan, Oct. 6, 1966, 41/65,578
Int. Cl. C01g 43/00
U.S. Cl. 23—347                    8 Claims

ABSTRACT OF THE DISCLOSURE

A process for producing, by use of uranium carbide material as a starting material, uranium nitrides and/or uranium nitride-carbides without a metal uranium process step, in which the uranium carbide material is heated and caused to undergo contact reaction with dried ammonia thereby to separate and remove all or a part of the carbon content in the uranium carbide material as a hydrocarbon gas, and the resulting product of the ammonia reaction is further heat-treated.

---

This invention relates generally to nuclear fuel substances and production thereof, and more particularly it relates to a new process for producing uranium nitrides and uranium carbonitrides in a simple manner without a process step involving metal uranium.

Uranium mononitride (UN) and uranium carbonitrides ($UN_{1-x}C_x$, where $1>x>0$) which are solid solutions of uranium mononitride and uranium monocarbide have high fissionable material density, high thermal conductivity, and other desirable properties and are considered to be promising materials as fuels for various reactors of new types. These compounds, furthermore, in comparison with uranium monocarbide (UC) having features similar to those mentioned above, have more desirable advantages as nuclear fuel materials, such as higher chemical stability, ease in stoichiometric control, and ease in obtaining single phase substances not containing admixtures of other substances such as compounds of higher order and uranium metal.

On the other hand, however, it has been necessary to pass through a metallic uranium process stage in the production of these compounds of uranium, and for this reason the process from starting materials to compounds becomes disadvantageously complicated.

More specifically, in the production of nuclear fuel materials, the process of rendering a natural or enriched uranium compound once into the form of an aqueous solution, adding ammonium thereto to cause ammonium diuranate (ADU) to precipitate, and converting this precipitate into the desired compound form has been considered to be the most common and feasible industrial procedure. A flow chart for the production of $UO_2$, UC, UN, and $UN_{1-x}C_x$ in this case is approximately as follows.

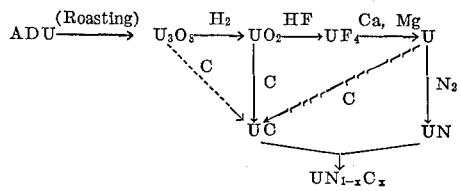

Thus, the production of uranium compounds UN and/or $UN_{1-x}C_x$ has been much more complicated than that of $UO_2$ and UC. Furthermore, the inclusion in the process of steps such as uranium metal reduction of $UF_4$ of low yield and castings has been an obstruction to the practical use of these compounds as nuclear fuels.

It is an object of the present invention to provide a simple process for producing easily and with high yield uranium nitrides and uranium carbonitrides which are desired for use in the atomic power field, without a step involving uranium metal, through the use of relatively simple apparatus.

Another object of the invention is to provide a process of the above stated character whereby a uranium nitride (UN) or a uranium carbonitrides ($UN_{1-x}C_x$) of any desired composition can be produced.

A further object of the invention is to provide a process of the above stated character which can be applied to various forms of uranium carbide starting materials and to any combination thereof.

According to the present invention, briefly summarised, there is provided a process for producing uranium mononitride or uranium carbonitride by heating a uranium carbide starting material which is industrially advantageous as a starting material at a temperature of at least 300 degrees C. thereby to cause it to react with dried ammonia, separating and removing all or a part of the carbon component within the starting material as a hydrocarbon gas thereby to produce nitrogen compounds of uranium, and heat treating at a high temperature the product thus produced.

The nature, principles, details, and utility of the invention will be more clearly apparent from the following detailed description beginning with a basic and general consideration and concluding with preferred embodiments of the invention.

As a chemical reaction for obtaining uranium nitrides directly from uranium carbides, the reaction of the following form has heretofore been known.

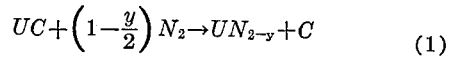

(where $y$ assumes a value of from 0.5 to 0 due to nitrogen pressure). This reaction is caused by heating the uranium carbide in a stream of nitrogen gas at a temperature of from 700 to 800 degrees C. During this reaction, disintegration of the uranium carbide structure occurs, whereby, while this reaction can be used for the purpose of fuel reprocessing, it cannot be utilised directly for production of uranium compounds such as uranium nitrides and uranium carbonitrides as contemplated by the present invention.

The reason for this is that free carbon produced by this reaction forms a fine and intimate mixture with uranium nitrides of higher order produced at the same time, and it is almost impossible to separate physically or chemically the substances in this mixture. If these formed substances were to be heat treated at a high temperature, a reaction which is the reverse of the above mentioned reaction would occur, and uranium carbides would merely be formed again.

I have found, however, that by causing a uranium carbide to react with ammonia, it is possible to cause all or a part of the carbon component within the starting material uranium carbide to be converted into hydrocarbon gas. By this method, the starting material uranium carbide releases a hydrocarbon and, at the same time, becomes a uranium nitride of high order, but, in contrast to the above described case of formation of free carbon, the separation of the gaseous hydrocarbon and the uranium compounds in powder form can be readily carried out. By heating at a high temperature the reaction product from which all or a part of the carbon component has been separated and removed in this manner, it is possible to produce UN or $UN_{1-x}C_x$ of any composition in accordance with the quantity of remaining carbon.

A hydrocarbon formed by the reaction of ammonia and a uranium carbide according to this method, in general, assumes a simple form in which the number of carbon atoms is small. As one example, the reaction formula in the case wherein pure uranium monocarbide is used as a starting material, and the hydrocarbon formed is represented by methane is as follows.

$$UC+(2-y)NH_3 \rightarrow UN_{2-y}+CH_4\uparrow+\left(\frac{2-3y}{2}\right)H_2\uparrow \quad (2)$$

This form of reaction is not limited to only the UC set forth as an example but proceeds in exactly the same manner also with respect to $UC_2$, $U_2C_3$, and mixtures thereof.

The fact that this reaction as exemplified in Formula 2 is a specially characteristic reaction with respect to ammonia is apparent also from the failure of attempts, after once causing higher order nitrides and free carbon to form by the known reaction of Formula 1, to reduce and remove the free carbon through the use of hydrogen or attempts to reduce UC itself by means of hydrogen.

This fact affords an important and effective measure in the reduction to practice of the method of the invention. It is well known that ammonia in a state of equilibrium undergoes thermal dissociation into nitrogen and hydrogen as its temperature rises. It can be considered, therefore, that when ammonia in which this thermal dissociation has progressed, and which thereby contains a considerable quantity of nitrogen and hydrogen, is used as a reaction agent, the starting material uranium carbide undergoes reaction of the form indicated in Formula 2 with the ammonia component of the reaction agent and, at the same time, quite naturally reacts also with the nitrogen thus contained in the reaction agent.

Since the hydrogen generated by the thermal dissociation does not participate in the reaction, as mentioned hereinbefore, the decarbonisation from the starting material arises with respect to only the reaction with the ammonia component and not with respect to the reaction with nitrogen. Therefore, in the utilisation of the concurrent relationship of these two reactions, controlling the state of thermal dissociation of the ammonia for reacting with the uranium carbide is an effective measure for determining the carbon content of a uranium carbonitride product.

In the case wherein a uranium carbonitride is the objective product, another measure for controlling its composition is afforded by the degree of progress of the reaction. More specifically, since a reaction of the form indicated in Formula 2 is retarded at a low temperature, if the heating, under these conditions, is stopped prior to completion of the reaction, unreacted uranium carbide will remain together with higher order nitrides due to the reaction. When the resulting product is heat treated, the UN formed from the higher order nitrides and the unreacted uranium carbide undergo a reaction producing a solid solution, whereby a $UN_{1-x}C_x$ is obtained.

The decarbonisation according to the method of the invention is subject to a restriction by a minimum temperature below which the progress of the reaction would be retarded to an extent whereby it would not be effective for practical purposes. I have found that the minimum temperature necessary for progress of this reaction at a satisfactory speed is 300 degrees C. I have found further that the process according to invention has the following various features.

The control of ammonia dissociation for producing a uranium nitride or producing uranium carbonitrides of various compositions can be accomplished by any of various means. Increasing the reaction pressure increases the ammonia concentration and ratio of ammonia to nitrogen and is effective for promoting the decarbonisation reaction. Passing a gas through the reactants increases the chances for contact between the uranium carbide and the ammonia prior to attainment of thermal equilibrium and is more advantageous for decarbonisation that reaction in a closed vessel in that the hydrocarbon formed can be removed out of the system. Furthermore, measures such as maintaining the temperatures of the ammonia at a low value relative to the temperature of the uranium carbide, adding hydrogen, and constructing the reaction vessel walls of a substance, such as glass, which is inert with respect to the progress of the dissociation reaction are effective in restrictively governing the ammonia dissociation.

By appropriately selecting and carrying out one or a combination of two or more of these measures, it is possible to produce the desired uranium nitride or uranium carbonitride. It should be mentioned that ample drying of the ammonia to be used in this reaction is necessary in order to prevent side reactions such as oxidation of uranium carbide.

The higher order nitrides obtained by the above described method (containing carbon or unreacted uranium carbide when a uranium carbonitride is desired) can be converted into UN or $UN_{1-x}C_x$ by high-temperature heat treatment. While the conversion of higher order nitrides not containing carbon is possible under a vacuum of a degree than $10^{-3}$ torr by heat treatment at a temperature above 1,000 degrees C., I have found that a heat treatment temperature of from 1,200 to 1,800 degrees C. is preferable in practice.

When a uranium carbonitride is the objective product, the formation of the solid solution of UN and UC is possible at a temperature of 1,100 degrees C., but for this purpose it is necessary to compress the formed substances, and, if the formed substances are to be heated in their original powder form, it is advantageous to cause sintering at the same time at a temperature higher than 1,600 degrees C. While, in view of the above considerations, heating at 1,800 degrees C. in a vacuum or in an inert gas can be applied for most general cases, the method of heat treating is not limited thereto.

Thus, as described above, the present invention provides a process whereby uranium nitrides and/or uranium nitride-carbides can be produced directly from a uranium carbide as a starting material without a process step involving metal uranium. An important feature of the process of the present invention is that it can be carried out with respect to all uranium carbides or to any combination thereof, whereby the stoichiometric control required in the production of the uranium carbide starting material is simplified and facilitated.

Another feature of the invention is that, as is apparent also from the above description, there is no cause of lowering of the true yield other than the loss due to the handling of samples. For example, in actual instances of practice, the yields resulting when 10 grammes of samples were taken were 99.5 percent or higher.

In order to indicate still more fully the nature, details, and utility of the invention, the following examples of typical procedure are set forth, it being understood that these examples are presented as illustrative only and that they are not intended to limit the scope of the invention.

In these examples, description is set forth with respect to the procedures and results of tests in which the following three samples A, B, and C were used as starting materials.

(A) Uranium carbide having a carbon content of 4.8 percent by weight. While this sample consisted of almost pure UC, the existence therein of a minute quantity of $UC_2$ was texturally determined. This sample contained 0.06 percent by weight of oxygen and 0.08 percent by weight of nitrogen as impurities.

(B) Uranium carbide with a carbon content of 5.4 percent by weight. The coexistence therein of UC and $UC_2$ was confirmed by X-ray diffraction. The oxygen and nitrogen contents were 0.12 and 0.08 percent, respectively, by weight.

(C) Sample obtained by heat treating sample B for 8 hours in a vacuum at 1,500 degrees C. and confirmed by X-ray to be a mixture of UC and $U_2C_3$. The oxygen and nitrogen contents were 0.16 and 0.10 percent, respectively, by weight.

Each of the above specified samples was ground to a grain size of −150 mesh in a gloved box filled with pure (99.99 percent) argon and was then stored until use.

In the tests of the following examples, all procedures of transference and handling of the samples were carried out in atmospheres of inert gas in order to prevent oxidation of the samples. For simplicity in the following description the above specified three samples will be referred to simply as samples A, B, and C. The oxygen contents in the starting materials and formed products indicated in these examples may be considered to be impurities accompanying the starting materials or impurities which have become admixed with the materials during the practice of the process and have no connection with the essential nature of the method of the invention.

EXAMPLE 1

As a decarbonisation reaction vessel, a vertical autoclave of externally heated type made of stellite and having an effective capacity of 30 cc. and strength to withstand an internal pressure of 2,000 kg./cm. was used. A crucible made of hard glass was placed in this autoclave and charged with 10 grammes (g.) of the above specified uranium carbide sample A. The autoclave was closed, and the interior thereof was then evacuated, and the autoclave was cooled with a freezing mixture of dry ice and alcohol.

Separately, on one hand, liquid ammonia which had been fully dehydrated beforehand by adding metallic sodium thereto was prepared in a glass pressure vessel, which was then connected to the above mentioned autoclave.

After the autoclave had been amply cooled, the evacuation system was shut off, and a valve in the line to the liquid ammonia was opened, whereby a quantity of the ammonia was transferred from the pressure vessel to the autoclave and condensed on the uranium carbide sample. The quantity of ammonia thus transferred was determined in accordance with a graphical curve indicating the temperature-pressure relationship previously obtained from the results of preparatory tests. Within the range of the conditions of this example, this quantity is of the order of from 8 to 25 cc. in terms of liquid ammonia at room temperature.

When the required quantity of ammonia had been sent into the autoclave, as verified by observation of a scale on the pressure vessel, the valve for controlling the supply of ammonia was closed. The autoclave was then heated at 300 degrees C. in an electric resistance furnace, and a reaction was caused under a pressure of 1,500 kg./cm.$^2$, fluctuations in which were within a range of ±100 kg./cm.$^2$.

In this reaction process, in all of these examples, the autoclave was so heated that its temperature rose at a rate of 200 degrees C. per hour to the specified reaction temperature, which was then maintained for two hours. Thereafter, the furnace power supply was switched off, and the furnace was left to cool. Any tendency of the pressure to exceed the specified value when the temperature reached the specified value was corrected by opening a pressure reducing valve to discharge excessive ammonia. In the case of the instant reaction at 300 degrees C., the pressure rise was gradual, and there were no indications throughout the heating period that pressure regulation was necessary.

The resulting product was in the form of fine powder of black colour. As a result of examination by X-ray diffraction of this product, diffraction lines uniquely characteristic of $UN_2$ and $U_2N_3$ as well as evidence of the presence of a considerable quantity of unreacted uranium carbide were observed. The quantity of residual carbon was 4.3 percent by weight, whereby the occurrence of decarbonisation was confirmed.

Next, this formed product was transferred to a tungsten crucible, heated for 30 minutes in an induction furnace at 1,800 degrees C. under a vacuum higher than 10$^{-4}$ torr, and then gradually cooled to 1,000 degrees C. over a period of 15 minutes. Thereafter, the heating power supply was shut off, and the product was left to cool. The resulting product was in the form of lumps of silvery gray colour and it was evident that sintering had progressed together with the reaction. As a result of X-ray diffraction, only clear diffraction lines indicating face centred cubic lattices characteristic of $UN_{1-x}C_x$ were obtained. The compositions of the process materials and products were as follows.

Starting material used: Sample A (carbon content 4.8% by weight)
Ammonia reaction product:
    Carbon, 4.3% by weight
    Nitrogen, 0.80% by weight
Heat treatment product:
    Carbon, 4.3% by weight
    Nitrogen, 0.42% by weight
    Oxygen, 0.09% by weight
Atomic formula: $UN_{0.1}C_{0.9}$

EXAMPLE 2

10 grammes of the uranium carbide sample A was caused to react with ammonia in the vertical autoclave of externally heated type made of stellite mentioned in Example 1 under the conditions of a temperature of 500 degrees C. and a pressure of 500 kg./cm.$^2$ (with fluctuations within a range of ±50 kg./cm.$^2$).

In such a reaction at 500 degrees C., since the ammonia gradually undergoes thermal dissociation as the heating proceeds to decompose into nitrogen and hydrogen, the autoclave pressure gradually rises. For this reason, the aforementioned pressure reducing valve in the instant example was opened approximately every 20 minutes to release a part of the gas. It was confirmed by a gas chromatograph that, in addition to a hydrocarbon in the discharged gas, nitrogen and hydrogen were also formed.

The reaction product was in the form of fine powder of black colour similarly as in Example 1, and as a result of X-ray diffraction, only diffraction lines characteristic of $UN_2$ and $U_2N_3$ were observed. The residual carbon quantity was 1.3 percent by weight.

Next, the reaction product was transferred to a tungsten crucible and subjected to the same treatment as in Example 1, whereupon a product in the form of silvery gray lumps was formed. As a result of X-ray diffraction lines indicative of face centred cubic lattices characteristic of $UN_{1-x}C_x$ were observed. The compositions of the formed products were as follows.

Starting material used: Sample A (carbon content, 4.8% by weight)
Ammonia reaction product:
    Carbon, 1.3% by weight
    Nitrogen, 7.8% by weight
Heat treatment product:
    Carbon, 1.4% by weight
    Nitrogen, 3.8% by weight
    Oxygen, 0.11% by weight
Atomic formula: $UN_{0.7}C_{0.3}$

EXAMPLE 3

10 grammes of the uranium carbide sample B was caused to react with ammonia in the vertical autoclave of externally heated type made of stellite mentioned in Example 1 under the conditions of a temperature of 500 degrees C. and a pressure of 500 kg./cm.$^2$ (with fluctuations within a range of ±50 kg./cm.²). Similarly as in the procedure of Example 2, the pressure reducing valve was opened approximately every 20 minutes to release a portion of the gas within the autoclave and thereby prevent pressure rise therewithin as hydrogen and nitrogen were produced because of thermal dissociation of the ammonia.

The resulting product was in the form of fine black powder similarly as in Examples 1 and 2. By X-ray diffraction, diffraction lines characteristic of $UN_2$ and $U_2N_3$ were observed. The residual carbon content was 2.5 percent by weight.

Next this product was further heat treated in a tungsten crucible as in Examples 1 and 2, whereupon a uranium nitrogen compound of the following composition was obtained.

Starting material used: Sample B (carbon content, 5.4% by weight)
Ammonia reaction product:
  Carbon, 2.5% by weight
  Nitrogen, 7.0% by weight
Heat treatment product:
  Carbon, 2.7% by weight
  Nitrogen, 2.3% by weight
  Oxygen, 0.12% by weight
Atomic formula: $UN_{0.4}C_{0.6}$

EXAMPLE 4

10 grammes of the uranium carbide sample C was caused to react in the same stellite autoclave as specified in Example 1 under the conditions of a temperature of 500 degrees C. and a pressure of 500 kg./cm.² (with fluctuations within a range of ±50 kg./cm.²). The pressure reducing valve was opened approximately every 20 minutes to release a portion of the gas similarly as in Examples 2 and 3.

The resulting product of the reaction was a fine powder of black colour similarly as in Examples 1, 2, and 3, and by X-ray diffraction, diffraction lines characteristic of $UN_2$ and $U_2N_3$ were detected. The residual carbon content was 2.2 percent by weight.

This ammonia reaction product was further heat treated in a tungsten crucible similarly as in the foregoing examples. The resulting product exhibited clear X-ray diffraction lines indicative of face centred cubic lattices characteristic of $UN_{1-x}C_x$ and was found to have a composition as set forth below.

Starting material used: Sample C (carbon content, 5.4% by weight)
Ammonia reaction product:
  Carbon, 2.2% by weight
  Nitrogen, 7.3% by weight
Heat treatment product:
  Carbon, 2.3% by weight
  Nitrogen, 2.7% by weight
  Oxygen, 0.14% by weight
Atomic formula: $UN_{0.5}C_{0.5}$ The compositions of the products obtained from the procedures of the foregoing examples are compiled in Table 1 for the purpose of comparison. As is apparent also from this Table 1, decarbonisation of a degree such that it can be distinguished within the range of error does not occur in a high-temperature treatment reaction.

EXAMPLE 5

20 grammes of the uranium carbide sample A was thinly spread in a glass boat, which was then placed in the central part of a cylindrical hard-glass core tube of a furnace, and the air within the core tube was displaced with dry argon.

This core tube was provided with an ammonia gas inlet tube similarly made of hard glass and passed through the centre of the core tube, the open end of this inlet tube being disposed above the sample in the boat. The gas inlet tube at its upstream end was divided into two inlet paths, one path being connected by way of a flowmeter and a pressure reducing valve to a pressure vessel in which dry ammonia had been stored, and the other path being connected through a palladium diaphragm purification device to a hydrogen cylinder. The core tube was provided at one end with a gas discharge opening through which the reaction gases could be discharged out of the apparatus through a bubbler.

After the sample had been placed in the boat as described above, heating of the core tube at the sample position was started in an electric resistance furnace, the temperature of the sample being raised in 30 minutes to 550 degrees C., which was thereafter maintained for 3 hours. Simultaneously with the start of heating, supplying of hydrogen and ammonia gas each at a flowrate of 500 cc./minute was started, the two gases being passed as a gas mixture through the gas inlet tube and ejected onto the sample.

After the three hours of heating, the power supply to the furnace was shut off, and, at the same time, the flow on only the ammonia side was stopped, the furnace being thus cooled to room temperature. The core tube was then purged again with argon, and the sample was taken out of the furnace.

As explained hereinbefore, the passing through of hydrogen, in itself, does not have the capability of causing decarbonisation of uranium carbide and was resorted to merely for the purpose of reducing the dissociation of ammonia.

The resulting reaction product, which was composed principally of higher order nitrides of black colour, was transferred into a tungsten crucible and heated for 30 minutes in a stream of argon at 1,900 degrees C. The resulting product was a sintered substance of silvery gray colour containing 3.2 percent of carbon, 1.8 percent of nitrogen, and 0.16 percent of oxygen as an impurity, all percentages being by weight. The results of X-ray diffraction indicated a distinct face centred cubic structure, which was identified as uranium nitride-monocarbide.

EXAMPLE 6

In this example, a reaction device of internally heated type made of carbon steel with a maximum pressure rating of 500 kg./cm.² and an internal volume of 1 litre was used. Electric power was supplied into the interior of the pressure device through pressure tight terminals. The opening of a gas inlet pipe was disposed immediately above the position of the sample within the device, and the discharge pipe was provided with a cover and was connected to a control valve and a pressure regulating valve adjusted at 250 kg./cm.².

3 grammes of the uranium carbide sample A was placed in a quartz boat, which was mounted on an electric heat-

TABLE 1

| | | Percent by weight | | | | | |
| | | Ammonia reaction product | | | Heat treatment product | | | |
| Ex. No. | Sample | C | C | N | C | N | O | Atomic Formula |
|---|---|---|---|---|---|---|---|---|
| 1 | A | 4.8 | 4.3 | 0.80 | 4.3 | 0.42 | 0.09 | $UN_{0.1}C_{0.9}$ |
| 2 | A | 4.8 | 1.3 | 7.8 | 1.4 | 3.8 | 0.11 | $UN_{0.7}C_{0.3}$ |
| 3 | B | 5.4 | 2.5 | 7.0 | 2.7 | 2.3 | 0.12 | $UN_{0.4}C_{0.6}$ |
| 4 | C | 5.4 | 2.2 | 7.3 | 2.3 | 2.7 | 0.14 | $UN_{0.5}C_{0.5}$ | ing device. A thermocouple was disposed immediately below the boat, and its electromotive force was led out by lead wires through the pressure tight terminals to measure the temperature. The interior of the device was once evacuated, and then pure hydrogen at a pressure of 120 kg./cm.$^2$ was introduced thereinto. Next, the hydrogen introducing system was disconnected, and a pressure injector filled with liquid ammonia which had been dried beforehand with sodium was connected to the inlet pipe of the reaction device.

After the sample had been heated to the specified temperature, liquid ammonia was supplied by the injector into the reaction device at a flow rate of 2 cc./minute, thereby being injected as a gas onto the heated sample. Whenever the pressure within the device exceeded 250 kg./cm.$^2$, surplus gas was released out of the device through the regulating valve.

After 90 minutes of reaction, the power supply was shut off, and the supply of ammonia was stopped, the device being thus left to cool. The control valve was then opened to lower the pressure within the device to atmospheric pressure, and the resulting product was taken out of the device.

This product was transferred to a tungsten crucible and heated for 30 minutes at a temperature of 1,850 degrees C. under a vacuum higher than 10$^{-4}$ torr in an induction furnace. Thereafter, the product was cooled to room temperature, whereupon a silvery gray product was obtained.

EXAMPLE 7

3 grammes of the uranium carbide sample B was heated for 90 minutes at a temperature of 170 degrees C. in an internally heated reaction device of the same type as that specified in Example 6, and the product of ammonia reaction thus produced was transferred to a tungsten crucible and heat treated in an induction furnace under the same conditions as those set forth in Example 6. As a result, a silvery gray product was obtained.

EXAMPLE 8

3 grammes of the uranium carbide sample A was heated for 30 minutes at a temperature of 900 degrees C. in a reaction device of the same type as that specified in Examples 6 and 7, and the product thus obtained was transferred to a tungsten crucible and heat treated by the same procedure as that set forth in the two preceding examples. As a result, a silvery gray product was obtained.

The samples, temperature, and other conditions and the compositions of the products in the above described Examples 6, 7, and 8 are set forth in Table 2.

TABLE 2

| Example No. | Temp. (° C.) | Heating time (min.) | Sample | Carbon content | Heat treatment product | | Atomic formula |
|---|---|---|---|---|---|---|---|
| | | | | | C content | N content | |
| 6 | 500 | 90 | A | 4.8 | 0.08 | 5.3 | UN |
| 7 | 750 | 90 | B | 5.4 | 3.3 | 1.7 | $UN_{0.3}C_{0.7}$ |
| 8 | 900 | 30 | A | 4.8 | 4.3 | 0.3 | $UN_{0.1}C_{0.9}$ |

It is to be observed that the carbon content in the product in Example 6 is lowered to approximately the same order as that of UN for nuclear fuel produced by a conventional process. The content of oxygen considered as an impurity is 0.1 percent or lower by weight in all cases.

It should be understood, of course, that the foregoing disclosure relates to only preferred embodiments and that it is intended to cover all changes and modifications of the examples of the invention herein chosen for the purposes of the disclosure, which do not constitute departures from the spirit and scope of the invention as set forth in the appended claims.

What I claim is:
1. A process for producing uranium nitride or carbonitride compounds which comprises steps of:
    (a) introducing into a decarbonization reaction vessel a uranium carbide starting material and dehydrated ammonia;
    (b) heating the uranium carbide starting material at a temperature of from 300° to 900° C. and under a pressure of from 200 kg./cm.$^2$ to 1500 kg./cm.$^2$ to cause said starting material to react with said dehydrated ammonia;
    (c) causing the uranium carbide starting material and the dehydrated ammonia to undergo contact-reaction to remove and separate, to a required degree, the carbon component contained in said starting material as a hydrocarbon gas; and
    (d) heat-treating in a vacuum the uranium compounds thus obtained from the ammonia reaction.

2. A process as defined in claim 1, wherein the contact-reaction between the uranium carbide starting material and the dehydrated ammonia is carried out to remove and separate a part of the carbon component in said starting material, thereby obtaining uranium carbonitride compounds.

3. A process as defined in claim 1, wherein the contact-reaction between the uranium carbide starting material and the dehydrated ammonia is carried out to remove and separate the entire carbon component in said starting material, thereby obtaining uranium nitride compounds.

4. The process as claimed in claim 1, in which the heat treatment of the product of the ammonia reaction is carried out at a temperature in the range of from 1,100 to 1,900 degrees C.

5. The process as claimed in claim 1, in which the uranium carbide starting material is a material selected from the group consisting of UC, $UC_2$, $U_2C_3$, and mixtures of at least two of these uranium carbides.

6. The process as claimed in claim 1, in which, simultaneously with the start of heating of the uranium carbide starting material, hydrogen gas is introduced together with the ammonia in gaseous form into the decarbonization reaction vessel, thereby to reduce the dissociation of the ammonia.

7. The process as claimed in claim 1, in which the temperature of the ammonia at the time of introduction thereof into the reaction vessel is lower than the temperature of the uranium carbide starting material and at least room temperature.

8. The process as claimed in claim 1, in which the de-carbonization reaction is promoted by increasing the reaction pressure to an amount not exceeding 1,500 kg./cm.$^2$.

References Cited

UNITED STATES PATENTS 3,334,974    8/1967    Fletcher et al. _____ 23—347

LELAND A. SEBASTIAN, Primary Examiner

U.S. Cl. X.R.

23—346